(12) United States Patent
Mcquinn (10) Patent No.: US 12,499,882 B2
(45) Date of Patent: Dec. 16, 2025

(54) LOW-LATENCY CONVERSATIONAL LARGE LANGUAGE MODELS

(71) Applicant: Google LLC, Mountain View, CA (US)

(72) Inventor: Emmett Aaron Mcquinn, San Francisco, CA (US)

(73) Assignee: Google LLC, Mountain View, CA (US)

( * ) Notice: Subject to any disclaimer, the term of this patent is extended or adjusted under 35 U.S.C. 154(b) by 273 days.

(21) Appl. No.: 18/323,992

(22) Filed: May 25, 2023

(65) Prior Publication Data

US 2024/0395246 A1    Nov. 28, 2024

(51) Int. Cl.

| | |
|---|---|
| *G06F 16/3329* | (2025.01) |
| *G06F 40/35* | (2020.01) |
| *G06N 3/02* | (2006.01) |
| *G10L 13/02* | (2013.01) |
| *G10L 13/08* | (2013.01) |
| *G10L 15/06* | (2013.01) |
| *G10L 15/183* | (2013.01) |

(Continued)

(52) U.S. Cl.
CPC .......... *G10L 15/183* (2013.01); *G10L 15/063* (2013.01); *G10L 2015/0631* (2013.01)

(58) Field of Classification Search
None
See application file for complete search history.

(56) References Cited

U.S. PATENT DOCUMENTS 11,238,241 B1 *   2/2022   Mallikarjuniah ....... H04L 51/02
12,118,320 B2 *  10/2024   Gelfenbeyn ............ G06F 40/30
12,135,958 B2 *  11/2024   Pandita ................... G10L 15/26

(Continued)

FOREIGN PATENT DOCUMENTS

WO    2022093192 A1    5/2022
WO    2023038654 A1    3/2023

OTHER PUBLICATIONS

Muyang Du et al., "Efficient Incremental Text-to-Speech on GPUs", Arxiv.Org, Cornell University Library, 201 Olin Library Cornell University Ithaca, NY 14853,Dec. 5, 2022 (Dec. 5, 2022), XP091385853.

(Continued)

*Primary Examiner* — Pierre Louis Desir
*Assistant Examiner* — Kristen Michelle Masters
(74) *Attorney, Agent, or Firm* — Honigman LLP; Brett A. Krueger; Grant Griffith (57) ABSTRACT

A method includes receiving a transcription of an utterance, processing, using a first model, the transcription to generate a first text segment that represents an initial portion of a response to the utterance, processing, using a TTS system, the first text segment to generate a first synthesized speech representation, and providing, for audible output, the first synthesized speech representation. The method also includes providing, to a second model different from the first model, the transcription and the first text segment, the second model comprising an LLM configured to process the transcription and the first text segment to generate a second text segment that represents a remaining portion of the response to the utterance. The method further includes obtaining a second synthesized speech representation generated from the second text segment, and providing, for audible output by the user device, the second synthesized speech representation.

24 Claims, 3 Drawing Sheets

(51) Int. Cl.
 *G10L 15/26* (2006.01)
 *G10L 25/30* (2013.01)

(56) References Cited

U.S. PATENT DOCUMENTS

2022/0115000 A1    4/2022  Beaufays et al.
2023/0385692 A1*  11/2023  Kang ................... G06N 20/00

OTHER PUBLICATIONS

International Search Report and Written Opinion issued in related PCT Application No. PCT/US2024/030364, dated Sep. 16, 2024.

\* cited by examiner

LOW-LATENCY CONVERSATIONAL LARGE LANGUAGE MODELS

TECHNICAL FIELD

This disclosure relates to conversational language models and, more particularly, to low-latency conversational large language models.

BACKGROUND

Automatic speech recognition (ASR) systems and large language models (LLMs) are increasingly used to provide conversational experiences between users and user devices. In general, an ASR system attempts to determine an accurate transcription of what a user utters to a user device, and an LLM generates, based on the transcription, a response to the utterance. In some examples, a text-to-speech (TTS) system provides an audible output by the user device that represents the response generated by the LLM to provide a conversational experience.

SUMMARY

One aspect of the disclosure provides a computer-implemented executed on data processing hardware that causes the data processing hardware to perform operations that include receiving a transcription of an utterance spoken by a user of a user device, processing, using a first model, the transcription to generate a first text segment that represents an initial portion of a response to the utterance, processing, using a text-to-speech system, the first text segment to generate a first synthesized speech representation of the initial portion of the response to the utterance, and providing, for audible output by the user device, the first synthesized speech representation. The operations also include providing, to a second model different from the first model, the transcription and the first text segment, the second model including a large language model (LLM) configured to process the transcription and the first text segment to generate a second text segment that represents a remaining portion of the response to the utterance. The operations further include obtaining a second synthesized speech representation generated from the second text segment, the second synthesized speech representation representing the remaining portion of the response to the utterance, and providing, for audible output by the user device, the second synthesized speech.

Implementations of the disclosure may include one or more of the following optional features. In some examples, the operations further include receiving audio data characterizing the utterance, the audio data captured by the user device, and processing, using an automatic speech recognition system, the audio data to generate the transcription. In some implementations, the first model executes on the user device, and the second model executes on a remote computing system in communication with the user device. In other implementations, wherein the first model and the second model both execute on a remote computing system in communication with the data processing hardware.

In some examples, the second model is trained on training transcriptions, each training transcription paired with a corresponding training initial response portion to condition the second model to learn how to generate a response to the training transcription that incorporates the corresponding training initial response portion. In some implementations, the first model is trained to generate the first text segment of one or more initial words in the response to the transcription such that the first synthesized speech representation generated from the one or more initial words includes a duration sufficient to mask a latency time period incurred while the second model processes the transcription and the first text segment to generate the second text segment. The one or more initial words may represent at least one of a generic phrase, a filler phrase, or a prefix phrase.

In some implementations, the first model includes a classifier model configured to select, based on the transcription, the first text segment from a plurality of pre-determined text segments. In other implementations, the first model includes a first LLM, and the LLM of the second model includes a second LLM having a greater number of parameters than the first LLM. In still other implementations, the first model includes an embedding model configured to project the transcription into an embedding space corresponding to a plurality of pre-determined first text segments.

In some examples, providing, for audible output by the user device, the second synthesized speech representation includes discontinuing providing, for audible output by the user device, a remaining portion of the first synthesized speech representation. In some implementations, the first synthesized speech representation is provided for audible output while at least one of providing the transcription and the first text segment to the second model or obtaining the second synthesized speech representation.

Another aspect of the disclosure provides a system that includes data processing hardware and memory hardware in communication with the data processing hardware. The memory hardware stores instructions that when executed on the data processing hardware causes the data processing hardware to perform operations that include receiving a transcription of an utterance spoken by a user of a user device, processing, using a first model, the transcription to generate a first text segment that represents an initial portion of a response to the utterance, processing, using a text-to-speech system, the first text segment to generate a first synthesized speech representation of the initial portion of the response to the utterance, and providing, for audible output by the user device, the first synthesized speech representation. The operations also include providing, to a second model different from the first model, the transcription and the first text segment, the second model including a large language model (LLM) configured to process the transcription and the first text segment to generate a second text segment that represents a remaining portion of the response to the utterance. The operations further include obtaining a second synthesized speech representation generated from the second text segment, the second synthesized speech representation representing the remaining portion of the response to the utterance, and providing, for audible output by the user device, the second synthesized speech.

Implementations of the disclosure may include one or more of the following optional features. In some examples, the operations further include receiving audio data characterizing the utterance, the audio data captured by the user device, and processing, using an automatic speech recognition system, the audio data to generate the transcription. In some implementations, the data processing hardware includes a user device, and the second model executes on a remote computing system in communication with the user device. In other implementations, wherein the first model and the second model both execute on a remote computing system in communication with the data processing hardware.

In some examples, the second model is trained on training transcriptions, each training transcription paired with a corresponding training initial response portion to condition the second model to learn how to generate a response to the training transcription that incorporates the corresponding training initial response portion. In some implementations, the first model is trained to generate the first text segment of one or more initial words in the response to the transcription such that the first synthesized speech representation generated from the one or more initial words includes a duration sufficient to mask a latency time period incurred while the second model processes the transcription and the first text segment to generate the second text segment. The one or more initial words may represent at least one of a generic phrase, a filler phrase, or a prefix phrase.

In some implementations, the first model includes a classifier model configured to select, based on the transcription, the first text segment from a plurality of pre-determined text segments. However, the first model could generate the first text segment without constraining the first text segment to be from a pre-determined set of text segments. In other implementations, the first model includes a first LLM, and the LLM of the second model includes a second LLM having a greater number of parameters than the first LLM. In still other implementations, the first model includes an embedding model configured to project the transcription into an embedding space corresponding to a plurality of pre-determined first text segments. In still further implementations, the first model may use a nearest neighbor search or database query to find a first text segment.

In some examples, providing, for audible output by the user device, the second synthesized speech representation includes discontinuing providing, for audible output by the user device, a remaining portion of the first synthesized speech representation. In some implementations, the first synthesized speech representation is provided for audible output while at least one of providing the transcription and the first text segment to the second model or obtaining the second synthesized speech representation.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) systems and large language models (LLMs) are increasingly used to provide conversational experiences between users and user devices. In general, an ASR system attempts to determine an accurate transcription of what a user utters to a user device, and an LLM generates, based on the transcription and/or unspoken or spoken device context represented as text or embeddings such as a user's location, prior conversation history, address book, on screen summary, etc., a response to the utterance. In some examples, a text-to-speech (TTS) system provides an audible output by the user device that represents the response generated by the LLM to provide a conversational experience. However, LLMs may have tens to hundreds of billions of parameters, which makes them unsuitable for implementation on most user devices, such as smart phones, tablets, digital assistant devices, infotainment systems, watches, wearables, etc. LLMs may be especially unsuitable for battery-powered user devices. Moreover, implementing LLMs on remote servers in the cloud may introduce unacceptable latency and/or jitter, which may interfere with or impede a natural conversational experience. Cloud implementations can see efficiency gains from coalescing multiple simultaneous requests across multiple users into a batch, processing them together on massively parallel hardware not available to a single device.

Recognizing that spoken words and synthesized speech are typically slow (e.g., only a few words per second) relative to the latency associated with a cloud-based LLM, implementations herein are directed toward systems and methods that use a small, low-latency first model executed on a user device (e.g., having fewer than a billion parameters) that may quickly process a transcription of an utterance to generate a first text segment that represents a predicted initial portion of a response to the utterance. The utterance may correspond to a query directed toward the cloud-based LLM. The user device may then immediately start to audibly output a corresponding synthesized speech representation of the initial portion of the response to the query. Because the first model is small (i.e., in terms of computational and memory requirements compared to the cloud-based LLM) and executes on the user device, the audible output of the synthesized speech representation of the initial portion of the response can begin very shortly after the utterance ends, thus, enabling disclosed systems and methods to begin conversationally responding to the utterance with very low latency.

While the user device generates and/or audibly outputs the synthesized speech representation of the initial portion of the response, a much larger second model (e.g., an LLM having hundreds of billions of parameters) executed by a remote computing system in the cloud may process the transcription, the first text segment and, in some examples, additional context to generate a second text segment that represents a remaining portion of the response to the utterance. The first text segment could be transmitted from the user device to the remote computing system in the cloud, or may alternatively be computed on the remote computing system in the cloud to mirror the model output running on the user device. Because, the second model may determine the second text segment while the synthesized speech representation of the initial portion of the response is being generated and/or audibly output, latency and/or jitter associated with generating the second text segment by the second model may be effectively masked by the audible output of the initial portion. Notably, the second model may generate the second text segment such that the remaining portion of the response cohesively, naturally, or logically follows the initial portion of the response already being audibly output by the user device. Alternatively, the second model may interrupt the audible output of the initial portion of the response such that a full response to the utterance need not include all of the initial portion determined by the first model.

Figure 1:
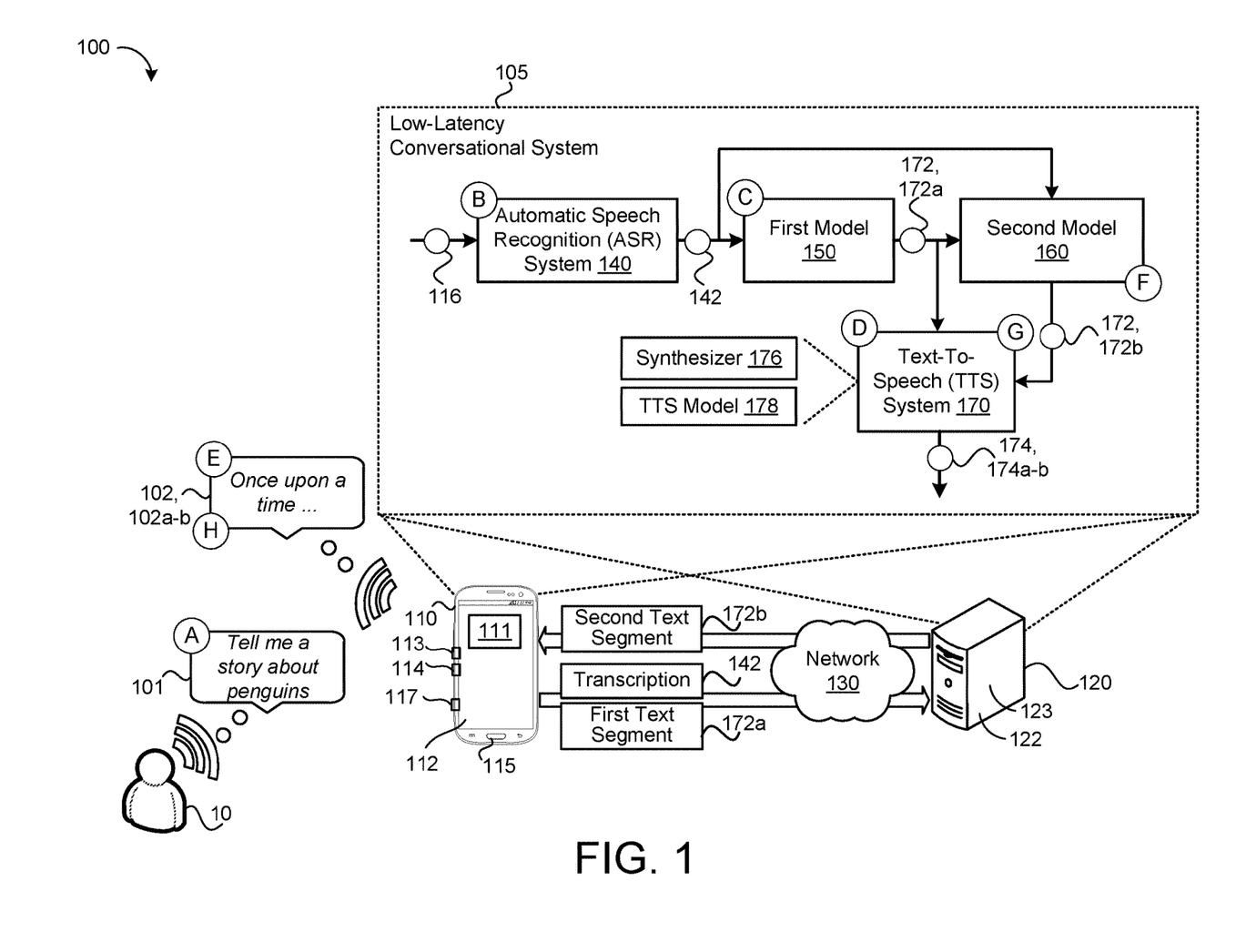
FIG. 1 is a schematic view of an example system including a low-latency conversational system.

FIG. 1 illustrates an example of a system 100 including a low-latency conversational system 105 for performing automatic speech recognition (ASR) of an utterance 101 spoken by a user 10 of a user device 110, and providing a low-latency response 102 to the utterance 101 to the user 10 via the user device 110. In the example of FIG. 1, the response 102 is audibly output by the user device 110. Additionally or alternatively, a textual representation of the response 102 may be graphically output by a digital assistant application 111 on a display 112 of the user device 110.

The system 100 includes the user device 110, a remote computing system 120, and a network 130. The user device 110 includes data processing hardware 113 and memory hardware 114. The user device 110 may include, or be in communication with, one or more audio capture devices 115 (e.g., an array of one or more microphone(s)) for capturing and converting utterances 101 spoken by the user 10 into audio data 116 (e.g., electrical signals or digital data). The user device 110 may include, or be in communication with, one or more audio output devices (e.g., speakers) 117 for converting audio data (e.g., electrical signals or digital data) into audible signals emitted by the speakers 117. The user device 110 may be any computing device capable of communicating with the remote computing system 120 through the network 130. The user device 110 includes, but is not limited to, desktop computing devices and mobile computing devices, such as laptops, tablets, smart phones, smart speakers/displays, digital assistant devices, smart appliances, internet-of-things (IoT) devices, infotainment systems, vehicle infotainment systems, and wearable computing devices (e.g., headsets, smart glasses, and/or watches).

The remote computing system 120 may be a distributed system (e.g., a cloud computing environment) having scalable elastic resources. The resources include computing resources 122 (e.g., data processing hardware) and/or storage resources 123 (e.g., memory hardware). Additionally or alternatively, the remote computing system 120 may be a centralized system. The network 130 may be wired, wireless, or a combination thereof, and may include private networks and/or public networks, such as the Internet.

FIG. 1 shows example operations (A) to (H) which illustrate an example flow of data and an example sequence of operations. As described herein, the user device 110 performs operations (B) to (E), (G), and (H), and the remote computing system 120 performs operation (F). However, it is understood that the remote computing system 120 may also perform operations (B) to (D), (F), and (G) in addition to, or in lieu of, the user device 110 performing the operations.

During stage (A), the user 10 speaks an utterance 101 (i.e., a query), and the user device 110 receives audio data 116 characterizing the utterance 101 captured by the microphone 115 of the user device 110. In the example shown, the utterance 101 includes the user 10 speaking "tell me a story about penguins."

During stage (B), an ASR system 140 of the low-latency conversational system 105 processes the audio data 116 to generate a transcription 142 of the utterance 101. The ASR system 140 may implement any number and/or type(s) of past, current, or future speech recognition systems, models and/or methods including, but not limited to, an end-to-end speech recognition model, such as streaming speech recognition models having recurrent neural network-transducer (RNN-T) model architectures, a hidden Markov model, an acoustic model, a pronunciation model, a language model, and/or a naïve Bayes classifier.

During stage (C), a first model 150 of the low-latency conversational system 105 processes the transcription 142 to generate a first text segment 172, 172a that represents a predicted initial portion 102a of a response 102 to the transcription 142 or, more generally, the utterance 101. Other examples inputs to the first model 150 include, but are not limited to, non-textual inputs such context information (e.g., a contact list on the user device 110, what media is currently playing on the user device 110, a location of the user device 110, weather, information associated with a device in communication with the user device 110, user sentiment, etc.) or multi-modal input (images, video, accelerometer, etc). That is, the first model 150 process the transcription 142 to predict one or more initial words (e.g., a first few words) that form the first text segment 172a representing the initial portion 102a of the response 102. The first model 150 may be a small model (e.g., fewer than a billion parameters) that is suitable for execution on the user device 110 to generate initial portions of responses to queries with low/reduced-latency. The first model 150 may be trained to produce just the first text segment 172a that represents the predicted initial portion 102a of the response 102 without producing/generating the complete response 102. In some implementations, the first text segment 172a represents a generic phrase, a filler phrase, or a prefix phrase. For example, the first model 150 may be trained to mirror language from the utterance 101 as the first text segment 172a. For instance, in the example of FIG. 1, the utterance 101 starts with "tell me a story about . . . " and the first model 150 may be trained to mirror back the phrase "once upon a time . . . ", such that the first text segment 172a acknowledges the request for a story but is not specific to any particular requested story. Another example utterance 101 starts with "teach me to" and the first model 150 may be trained to mirror back the phrase "I'm a beginner . . . " or "sure I can help you learn to . . . ", such that the first text segment 172a acknowledges the request for information but is not specific to any particular requested information. In some implementations, the first model 150 is configured to select the first text segment 172a from a plurality of pre-determined text segments. In general, the first model 150 may be trained to provide flexibility in the generation of a remaining portion 102b of the response 102 by a second model 160. In the example shown, the first model 150 executes on the user device 110 and the second model 160 executes on the remote computing system 120. However, both the first model 150 and the second model 160 may execute on the remote computing system 120. Moreover, both the first model 150 and the second model 160 may execute on the user device 110.

In some implementations, the first model 150 selects the length of the first text segment 172a such that a synthesized speech representation 174, 174a generated from the first text segment 172a includes a duration sufficient to mask (e.g., is longer than) an anticipated latency or jitter time period incurred while the second model 160 executing on the remote computing system 120 processes the transcription 142 and first text segment 172a to generate the second text segment 172b. Here, the length of the first text segment 172a may be pre-determined. Alternatively, the first model 150 may dynamically determine the length of the first text segment 172a based on actual latencies associated with the second model 160 for other recent utterances 101, which may vary with, for example, a processing load of the remote computing system 120 executing the second model 160, a transmission delay in the network 130, etc.

In some examples, the first model 150 includes a language model or an LLM, albeit having fewer parameters than an LLM corresponding to the second model 160. In such examples, the first model 150 could be a first LLM associated with a scaled down parameter count version of a second LLM that corresponds to the second model 160. Alternatively, a language model or an LLM of the first model 150 may be trained separately and differently from the second model 160 on a task that only includes predicting the initial portion 102a of a response 102. Notably, separate training of the first model 150 and the second model 160 may better enable the second model 160 to recover from errors of the first model 150 in generating the first text segment 172a. Alternatively, the first model 150 may include an embedding model that projects the transcription 142 into an embedding space corresponding to a plurality of pre-determined first text segments. Alternatively, the first model 150 may include a classifier model configured to select, based on the transcription 142, the first text segment 172a from a plurality of pre-determined first text segments. Alternatively, the first model 150 may include a natural language processing/understanding (NLP/NLU) module. In some implementations, the ASR system 140 and the first model 150 are combined into and trained as a single system or model.

During stage (D), a text-to-speech (TTS) system 170 of the low-latency conversational system 105 processes the first text segment 172a to generate a first synthesized speech representation 174, 174a of the initial portion 102a of the response 102. The TTS system 170 may implement any number and/or type(s) of past, current, or future TTS systems, models and/or methods capable of processing a text segment 172 to generate a corresponding synthesized speech representation 174. Example TTS systems 170 include, but are not limited to, a parametric TTS model and a deep neural network (e.g., an attention-based Tacotron network). In some implementations, the TTS system 170 includes a TTS model 178, that generates synthesized speech features (e.g., mel-spectrogram frames), and a synthesizer 176 (e.g., a vocoder, or generative neural network), that processes the synthesized speech features to generate the synthesized speech representations 174 as time-domain audio waveforms (e.g., time-domain audio waveforms that define an audio signal's amplitude over time) that can be audibly emitted by the speaker(s) 117 of the user device 110. In some implementations, the TTS system 170 includes the synthesizer 176 and the TTS model 178. However, the synthesizer 176 may be implemented separately from the TTS system 170 and also used for other purposes. Alternatively, synthesized speech representations 174 for pre-determined first text segments could be pre-computed and stored on the user device 110 or the remote computing system 120 for retrieval. In some examples, the TTS system 170 generates the synthesized speech representation 174 based on other inputs, such as, a prosody, a speaking rate, an emotion as represented by, for example, tokens, emojis, and text prompts.

During stage (E), the first synthesized speech representation 174a is provided for audible output by the speaker 117 of the user device 110, as the initial portion 102a of the response 102. Additionally or alternatively, during stage (E), the initial portion 102a of the response 102 is textually output by the digital assistant application 111 on the display 112 of the user device 110.

In some implementations, when the transcription 142 of the utterance 101 includes a query requiring an Internet search ("who is Jane Smith"), the user device 110 may bypass processing of the transcription 142 by the first model 150 and directly generate the first synthesized speech representation 174a. In this scenario, the second model 160 may be responsible for generating the complete response 102.

During stage (F), in the example shown, the user device 110 provides the transcription 142 and the first text segment 172a to the second model 160 executing on the remote computing system 120. Notably, the second model 160 is different and separate from the first model 150. The second model 160 processes the transcription 142 and the first text segment 172a to generate a second text segment 172b that represents a remaining portion 102b of the response 102. Here, the second model 160 generates the second text segment 172b to naturally or logically follow the first text segment 172a. That is, the second model 160 blends the second text segment 172b with the first text segment 172a to generate a cohesive complete response 102. In some implementations, the second model 160 is trained to generate the second text segment 172b by generating a complete response to the transcript 142 and then discarding the first text segment 172a.

In some examples, the second model 160 includes the LLM. In some implementations, the second model 160 is trained on training transcriptions characterizing training queries, where each training transcription corresponds to a respective query and is paired with a corresponding ground-truth complete response to the respective query. Here, the ground-truth complete response may include a corresponding ground-truth initial response portion (e.g., one of a plurality of predetermined first text segments) to the respective query to condition the second model 160 to learn how to generate a corresponding ground-truth remaining response portion (e.g., a second text segment) that incorporates the corresponding ground-truth initial response portion. Alternatively, the second model 160 may be prompted to generate the remaining response portion starting with the first text segment 172a.

In some implementations, the second model 160 causes the user device 110 to discontinue, at stage (E), the providing, for audible output, a remaining portion of the first synthesized speech representation 174a. For example, when the second model 160 determines that it cannot generate a suitable second text segment 172b that cohesively, naturally, or logically follows the first text segment 172a.

In some instances, when the second model 160 is not available (e.g., due to a network failure), the user device 110 may provide, for audible output by the speaker 117, a synthesized speech representation of a pre-determined phrase such as "Sorry, I'm not thinking clearly right now because I am disconnected from the Internet. Let's try again soon." Similarly, when the second model 160 is experiencing a longer than expected latency, the user device 110 may provide, for audible output by the speaker 117, a synthesized speech representation of a pre-determined phrase such as "Please wait while I further consider your query." Moreover, when the second model 160 does not timely respond to a query and there is still time remaining while audibly outputting the first synthesized speech representation 174a of the initial portion of the response, the user device 110 may resend the query to the second model 160.

During stage (G), the user device 110 obtains a second synthesized speech representation 174b representing the remaining portion 102b of the response 102 by receiving the second text segment 172b from the remote computing system 120 and executing the TTS system 170 locally to convert the second text segment 172b into the second synthesized speech representation 174b. Alternatively, the user device 110 obtains the second synthesized speech representation 174b by receiving the second synthesized speech representation 174b directly from the remote computing system 120, whereby the remote computing system 120 executes the TTS system 170 to generate the second synthesized speech representation 174b from the second text segment 172b. Here, the second synthesized speech representation 174b received from the remote computing system 120 may include time-domain audio waveforms (e.g., as streaming audio data or a compressed audio file). Optionally, the remote computing system 120 may execute the TTS model 178 of the TTS system 170 to convert the second text segment 172b into a sequence of speech features in the frequency-domain, such as spectrograms, and transmit the speech features to the user device 110 which may execute the synthesizer 176 (e.g., vocoder) to convert the speech features into time-domain audio waveforms corresponding to the second synthesized speech representation 174b.

During stage (H), the second synthesized speech representation 174b is provided for audible output by the speaker(s) 117 of the user device 110, as the remaining portion 102b of the response 102. Additionally or alternatively, during stage (H), the second text segment 172b representing the remaining portion 102b of the response 102 is graphically output by the digital assistant application 111 on the display 112 of the user device 110. The display 112 may include a graphical user interface.

Figure 2:
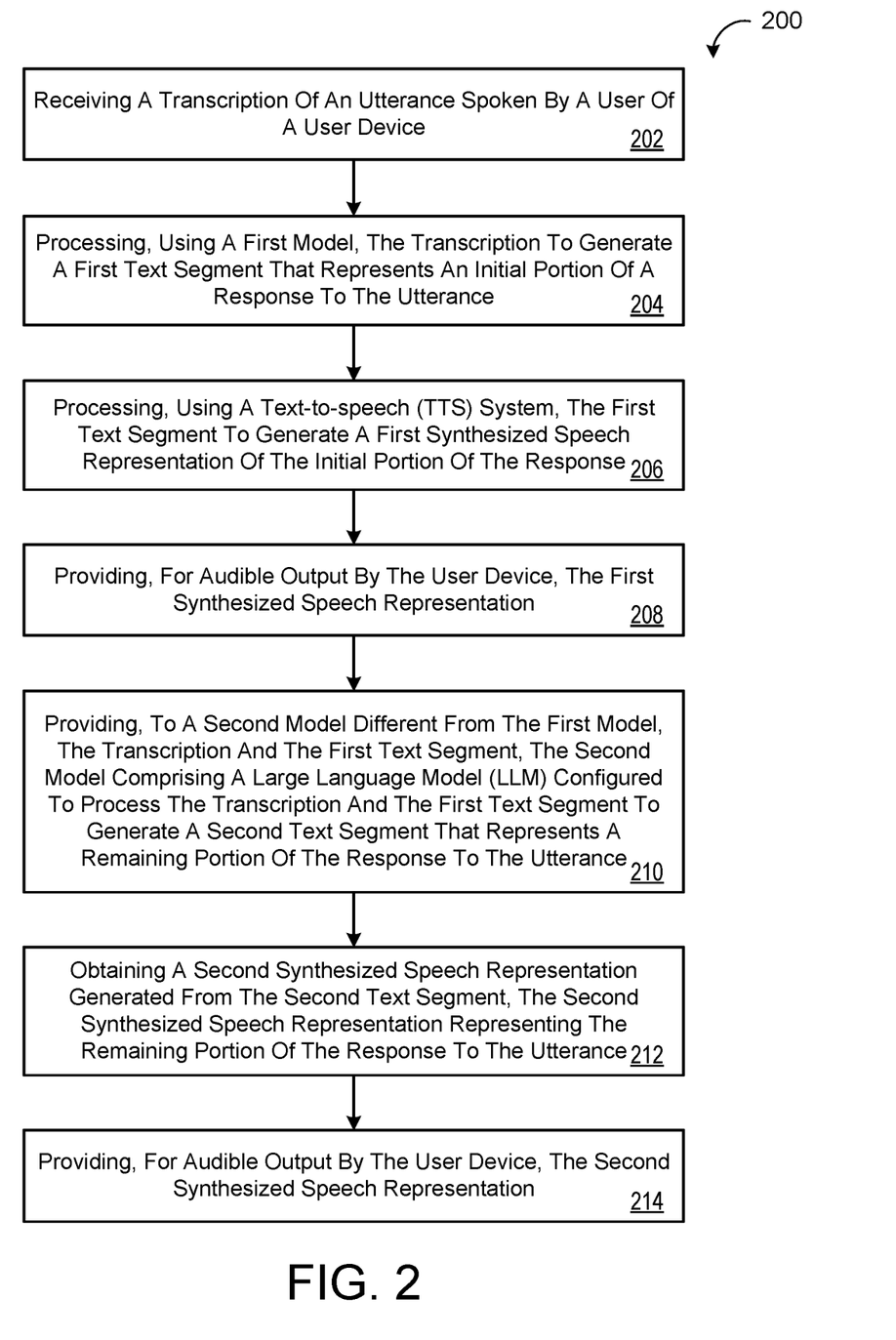
FIG. 2 is a flowchart of an exemplary arrangement of operations for a method of operating a low-latency conversational system.

FIG. 2 is a flowchart of an exemplary arrangement of operations for a method 200 of operating a low-latency conversational system. The operations may execute on data processing hardware 310 (FIG. 3) by executing instructions stored on memory hardware 320 in communication with the data processing hardware 320. The data processing hardware 310 may include the data processing hardware 113 (FIG. 1) of the user device 110 and/or the data processing hardware 122 (FIG. 1) of the remote computing system 120. The memory hardware 320 may include the data memory hardware 114 (FIG. 1) of the user device 110 and/or the memory hardware 123 of the remote computing system 120.

At operation 202, the method 200 includes receiving a transcription 142 of an utterance 101 spoken by a user 10 of a user device 110. The utterance 101 may correspond to a query directed toward a LLM. The method 200 includes, at operation 204, processing, using a first model 150, the transcription 142 to generate a first text segment 172a that represents an initial portion 102a of a response 102 to the utterance 101. At operation 206, the method 200 includes processing, using a TTS system 170, the first text segment 172a to generate a first synthesized speech representation 174a of the initial portion 102a of the response 102 to the utterance 101. At operation 208, the method 200 includes providing, for audible output by the user device 110, the first synthesized speech representation 174a.

At operation 210, the method 200 includes providing, to a second model 160 different from the first model 150, the transcription 142 and the first text segment 172a. The second model 160 includes the LLM configured to process the transcription 142 and the first text segment 172a to generate a second text segment 172b that represents a remaining portion 102b of the response 102 to the utterance 101.

At operation 212, the method 200 includes obtaining a second synthesized speech representation 174b generated from the second text segment 172b, the second synthesized speech representation 174b representing the remaining portion 102b of the response 102 to the utterance 101. The method 200 includes, at operation 214, providing, for audible output by the user device 110, the second synthesized speech representation 174b.

Figure 3:
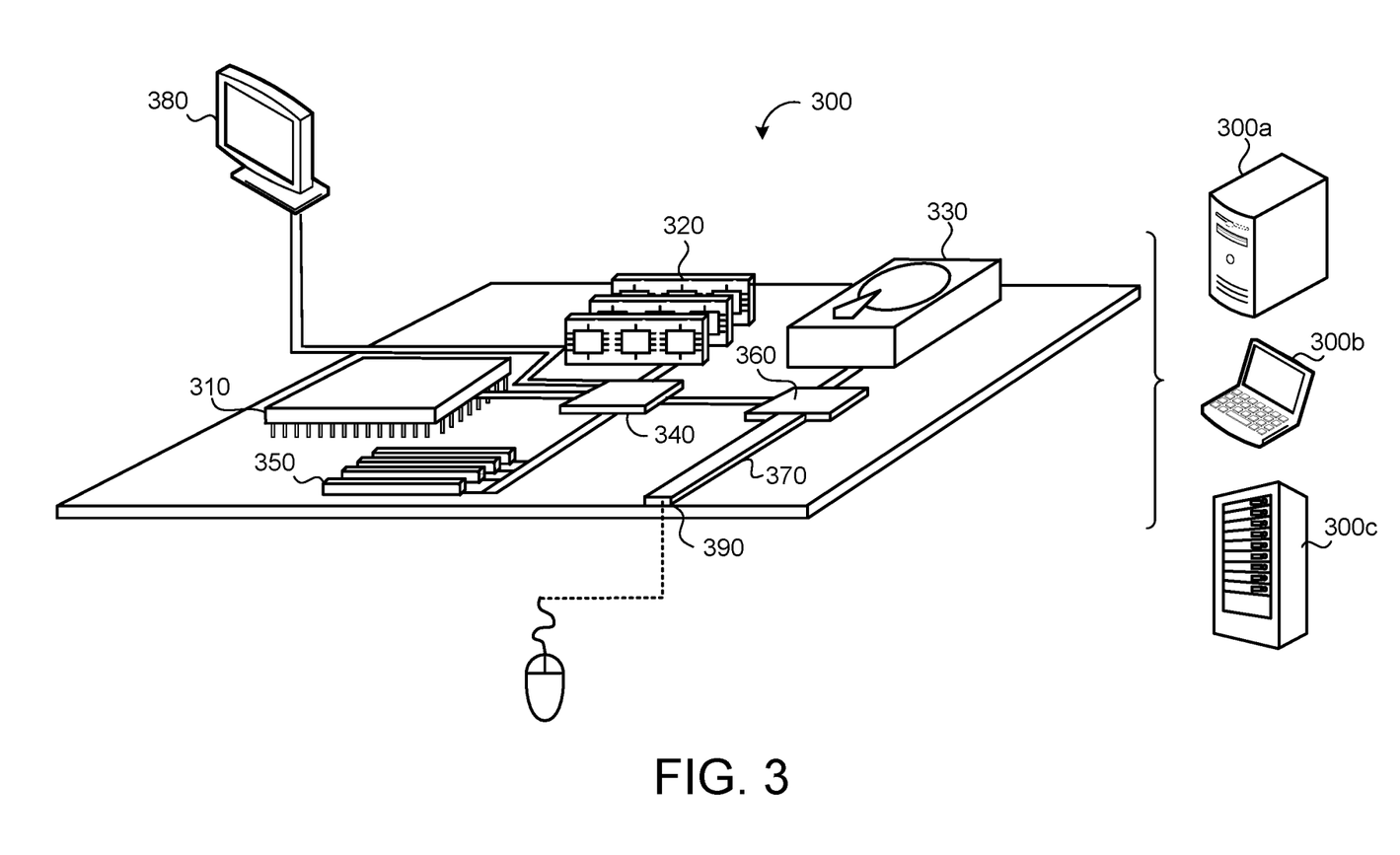
FIG. 3 is a schematic view of an example computing device that may be used to implement the systems and methods described herein.

FIG. 3 is schematic view of an example computing device 300 that may be used to implement the systems and methods described in this document. The computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 300 includes a processor 310 (i.e., data processing hardware) that can be used to implement the data processing hardware 113 and/or 122, memory 320 (i.e., memory hardware) that can be used to implement the memory hardware 114 and/or 123, a storage device 330 (i.e., memory hardware) that can be used to implement the memory hardware 114 and/or 123, a high-speed interface/controller 340 connecting to the memory 320 and high-speed expansion ports 350, and a low speed interface/controller 360 connecting to a low speed bus 370 and a storage device 330. Each of the components 310, 320, 330, 340, 350, and 360, are interconnected using various busses, and may be mounted on a common motherboard or in other manners as appropriate. The processor 310 can process instructions for execution within the computing device 300, including instructions stored in the memory 320 or on the storage device 330 to display graphical information for a graphical user interface (GUI) on an external input/output device, such as display 380 coupled to high speed interface 340. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 320 stores information non-transitorily within the computing device 300. The memory 320 may be a computer-readable medium, a volatile memory unit(s), or non-volatile memory unit(s). The non-transitory memory 320 may be physical devices used to store programs (e.g., sequences of instructions) or data (e.g., program state information) on a temporary or permanent basis for use by the computing device 300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 330 is capable of providing mass storage for the computing device 300. In some implementations, the storage device 330 is a computer-readable medium. In various different implementations, the storage device 330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 320, the storage device 330, or memory on processor 310.

The high speed controller 340 manages bandwidth-intensive operations for the computing device 300, while the low speed controller 360 manages lower bandwidth-intensive operations. Such allocation of duties is exemplary only. In some implementations, the high-speed controller 340 is coupled to the memory 320, the display 380 (e.g., through a graphics processor or accelerator), and to the high-speed expansion ports 350, which may accept various expansion cards (not shown). In some implementations, the low-speed controller 360 is coupled to the storage device 330 and a low-speed expansion port 390. The low-speed expansion port 390, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 300a or multiple times in a group of such servers 300a, as a laptop computer 300b, or as part of a rack server system 300c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   receiving a transcription of an utterance spoken by a user of a user device;
   processing, using a trained first model, the transcription to generate a first text segment that represents an initial portion of a response to the utterance;
   processing, using a text-to-speech system, the first text segment to generate a first synthesized speech representation of the initial portion of the response to the utterance;
   providing, for audible output by the user device, the first synthesized speech representation;
   providing, to a trained second model different from the trained first model, the transcription and the first text segment, the trained second model comprising a large language model (LLM) configured to process the transcription and the first text segment to generate a second text segment that represents a remaining portion of the response to the utterance;
   obtaining a second synthesized speech representation generated from the second text segment, the second synthesized speech representation representing the remaining portion of the response to the utterance; and
   after the first synthesized speech representation of the initial portion of the response to the utterance is audibly output by the user device, providing, for audible output from the user device, the second synthesized speech representation,
   wherein the first synthesized speech representation and the second synthesized speech representation audibly output by the user device are both response to the same utterance spoken by the user of the user device.

2. The computer-implemented method of claim 1, wherein the operations further comprise:
   receiving audio data characterizing the utterance, the audio data captured by the user device; and
   processing, using an automatic speech recognition system, the audio data to generate the transcription.

3. The computer-implemented method of claim 1, wherein:
   the data processing hardware resides on the user device;
   the trained first model executes on the data processing hardware; and
   the trained second model executes on a remote computing system in communication with the data processing hardware.

4. The computer-implemented method of claim 1, wherein:
   the data processing hardware resides on a remote computing system in communication with the user device; and
   the trained first model and the second model both execute on the data processing hardware.

5. The computer-implemented method of claim 1, wherein the trained second model is trained on training transcriptions, each training transcription paired with a corresponding training initial response portion to condition the second model to learn how to generate a response to the training transcription that incorporates the corresponding training initial response portion.

6. The computer-implemented method of claim 1, wherein the trained first model is trained to generate the first text segment of one or more initial words in the response to the transcription such that the first synthesized speech representation generated from the one or more initial words includes a duration sufficient to mask a latency time period incurred while the trained second model processes the transcription and the first text segment to generate the second text segment.

7. The computer-implemented method of claim 6, wherein the one or more initial words represent at least one of a generic phrase, a filler phrase, or a prefix phrase.

8. The computer-implemented method of claim 1, wherein the trained first model comprises a classifier model configured to select, based on the transcription, the first text segment from a plurality of pre-determined text segments.

9. The computer-implemented method of claim 1, wherein:
   the trained first model comprises a first LLM; and
   the LLM of the trained second model comprises a second LLM having a greater number of parameters than the first LLM.

10. The computer-implemented method of claim 1, wherein the trained first model comprises an embedding model configured to project the transcription into an embedding space corresponding to a plurality of pre-determined first text segments.

11. The computer-implemented method of claim 1, wherein providing, for audible output from the user device, the second synthesized speech representation comprises discontinuing providing, for audible output by the user device, a remaining portion of the first synthesized speech representation.

12. The computer-implemented method of claim 1, wherein the first synthesized speech representation is provided for audible output while at least one of providing the transcription and the first text segment to the trained second model or obtaining the second synthesized speech representation.

13. A system comprising:
   data processing hardware; and
   memory hardware in communication with the data processing hardware and storing instructions that when executed on the data processing hardware cause the data processing hardware to perform operations comprising:
      receiving a transcription of an utterance spoken by a user of a user device;
      processing, using a trained first model, the transcription to generate a first text segment that represents an initial portion of a response to the utterance;
      processing, using a text-to-speech system, the first text segment to generate a first synthesized speech representation of the initial portion of the response to the utterance;
      providing, for audible output by the user device, the first synthesized speech representation;
      providing, to a trained second model different from the trained first model, the transcription and the first text segment, the trained second model comprising a large language model (LLM) configured to process the transcription and the first text segment to generate a second text segment that represents a remaining portion of the response to the utterance;
      obtaining a second synthesized speech representation generated from the second text segment, the second synthesized speech representation representing the remaining portion of the response to the utterance; and
      after the first synthesized speech representation of the initial portion of the response to the utterance is audibly output by the user device, providing, for audible output from the user device, the second synthesized speech representation, wherein the first synthesized speech representation and the second synthesized speech representation audibly output by the user device are both response to the same utterance spoken by the user of the user device.

14. The system of claim 13, wherein the operations further comprise:

receiving audio data characterizing the utterance, the audio data captured by the user device; and processing, using an automatic speech recognition system, the audio data to generate the transcription.

15. The system of claim 13, wherein:

the data processing hardware resides on the user device;

the trained first model executes on the data processing hardware; and the trained second model executes on a remote computing system in communication with the data processing hardware.

16. The system of claim 13, wherein:

the data processing hardware resides on a remote computing system in communication with the user device; and the trained first model and the second model both execute on the data processing hardware.

17. The system of claim 13, wherein the trained first model is trained to generate the first text segment of one or more initial words in the response to the transcription such that the first synthesized speech representation generated from the one or more initial words includes a duration sufficient to mask a latency time period incurred while the trained second model processes the transcription and the first text segment to generate the second text segment.

18. The system of claim 13, wherein the trained first model is trained to generate the first text segment of one or more initial words in the response to the transcription such that the first synthesized speech representation generated from the one or more initial words includes a duration sufficient to mask a latency time period incurred while the trained second model processes the transcription and the first text segment to generate the second text segment.

19. The system of claim 18, wherein the one or more initial words represent at least one of a generic phrase, a filler phrase, or a prefix phrase.

20. The system of claim 13, wherein the trained first model comprises a classifier model configured to select, based on the transcription, the first text segment from a plurality of pre-determined text segments.

21. The system of claim 13, wherein:

the trained first model comprises a first LLM; and the LLM of the trained second model comprises a second LLM having a greater number of parameters than the first LLM.

22. The system of claim 13, wherein the trained first model comprises an embedding model configured to project the transcription into an embedding space corresponding to a plurality of pre-determined first text segments.

23. The system of claim 13, wherein providing, for audible output by the user device, the second synthesized speech representation comprises discontinuing providing, for audible output by the user device, a remaining portion of the first synthesized speech representation.

24. The system of claim 13, wherein the first synthesized speech representation is provided for audible output while at least one of providing the transcription and the first text segment to the trained second model or obtaining the second synthesized speech representation.

* * * * *